(12) United States Patent
Hamamura et al.

(10) Patent No.: US 6,677,722 B2
(45) Date of Patent: Jan. 13, 2004

(54) SERVO CONTROL METHOD

(75) Inventors: Minoru Hamamura, Shizuoka-ken (JP); Jun Fujita, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/122,298

(22) Filed: Apr. 16, 2002

(65) Prior Publication Data

US 2003/0020427 A1 Jan. 30, 2003

(30) Foreign Application Priority Data

Apr. 19, 2001 (JP) ..................... P2001-121239

(51) Int. Cl.[7] ........................ G05D 23/275; G05B 5/01; G05B 19/29; G05B 19/25
(52) U.S. Cl. ................... 318/632; 318/623; 318/572; 318/600; 700/188; 700/193; 700/45
(58) Field of Search ................. 318/632, 621, 318/623, 568.22, 569–572, 600, 560; 700/186, 188, 193, 194, 44, 45

(56) References Cited

U.S. PATENT DOCUMENTS

| 4,947,336 A | * | 8/1990 | Froyd ........................ 700/45 |
| 5,680,271 A | * | 10/1997 | Yatsu ........................ 700/45 |
| 5,751,585 A | * | 5/1998 | Cutler et al. ................. 700/161 |
| 5,936,366 A | * | 8/1999 | Hamamura et al. ......... 318/560 |
| 6,470,225 B1 | * | 10/2002 | Yutkowitz .................... 700/44 |
| 6,563,666 B1 | * | 5/2003 | LaPanse ..................... 318/560 |

FOREIGN PATENT DOCUMENTS

| DE | 19847339 A1 | * | 5/1999 | .......... G05B/19/19 |
| JP | 02100105 A | * | 4/1990 | .......... G05B/19/18 |
| JP | 4-271290 | | 9/1992 | |
| JP | 7-78031 | | 3/1995 | |
| JP | 08095643 A | * | 4/1996 | ............ G05D/3/12 |
| JP | 11-184529 | | 7/1999 | |
| JP | 11309646 A | * | 11/1999 | ........... B23Q/15/14 |
| JP | 2000-172341 | | 6/2000 | |

* cited by examiner

*Primary Examiner*—Robert E. Nappi
*Assistant Examiner*—Edgardo San Martin
(74) *Attorney, Agent, or Firm*—Finnegan, Henderson, Farabow, Garrett & Dunner, L.L.P.

(57) ABSTRACT

The servo control method operates a set value of a first-order lag time constant of a feedback compensation by both a detected mechanical position value and a transfer function corresponding to a change of an angular velocity about each axis under a multiple-axes simultaneous control. Further, the servo control method sets a feedforward amount so that the transfer function about the each axis is the same.

5 Claims, 7 Drawing Sheets

FIG.3A
PRIOR ART
X AXIS

FIG.3B
PRIOR ART
Y AXIS

FIG.4A
PRIOR ART
X AXIS

FIG.4B
PRIOR ART
Y AXIS

ANGULAR VELOCITY ω red/sec

FIG.8

ANGULAR VELOCITY ω red/sec

THE DIFFERENCE BETWEEN
X-AXIS ELASTIC DISLOCATION AND
Y-AXIS ELASTIC DISLOCATION

SERVO CONTROL METHOD

BACKGROUND OF THE INVENTION

1. Field of the Invention

The present invention relates to a servo control method to synchronously control multi axes of machines. Especially, this invention relates to the servo control method about a Numerical Control machine tool (hereinafter, Numerical Control is abbreviated to NC.), a robot and the like to control a contour.

2. Description of the Related Art

Recent machine tools have been demanded to drive the machine at a high velocity or a high acceleration/deceleration in order to improve working efficiency. Further, a high-precision contouring control is demanded. The contouring control is to relate motions about two axes or more multiple axes at the same time with a linear interpolation, a circular interpolation and the like, thereby an aisle of tool is always controlled.

There are following problems at a high acceleration/deceleration operation and a high velocity operation.
(1) A ball screw is extended (due to an elastic deformation) by an influence of an inertial force caused by the high acceleration/deceleration, whereby generating a distance between a commanded position and a present position.
(2) A radius reduction amount is increased by the high-velocity operation.
(3) Ordinarily, a table is mounted on a saddle, and then a mass ratio between a spindle and a column is twice or more in a vertical type machine. Also in a horizontal type machine, the mass ratio between the spindle and the column is twice or more if a column drive and the like are employed. If the two axes are driven at the same time under the above-described condition, an error due to the inertial force is increased twice or more, so that an elliptic error is generated in the circular interpolation.
(4) At high velocity, a viscous friction increases, and then the velocity cannot be followed in a transient state. Thus, a phase shift occurs, thereby causing an error that an axis of a circular interpolation is inclined.

Following countermeasures and the like against the above problems have been taken conventionally.
(1) As for the velocity, a velocity feedforward corrects a velocity follow-up error. Also as for the acceleration, an acceleration feedforward improves a follow-up characteristics of the acceleration.
(2) A linear scale detects and corrects a mechanical position error.

As some technologies for correcting a mechanical elastic deformation in a semi-closed loop control type,
(1) a technology for correcting the elastic deflection by the inertial force of the machine with the acceleration feedforward (Japanese Patent Application Laid-Open No. H7-78031)
(2) a technology for correcting the elastic deflection by the inertial force of the machine with the feedforward by estimating a rigidity (Japanese Patent Application Laid-Open No. H4-271290)
(3) a technology for correcting the elastic deflection of the machine considering a load weight and a viscous resistance in the semi-closed loop control type (Japanese Patent Application Laid-Open No. 2000-172341)
(4) a technology for correcting the elastic deflection of the machine with feedforward considering the load weight and the viscous resistance (Japanese Patent Application Laid-Open No. H11-184529) have been well known.

The countermeasure (1) is taken with the semi-closed loop control type, thereby cannot correcting a lead error of the ball screw, an error due to a thermal dislocation and the like. Therefore, a high-precision feed drive cannot be executed. The countermeasure (2) is executed, and then the full closed loop control type generates a time lag corresponding to at least a sampling time, thereby causing a follow-up error. Thus, the lead error of the ball screw, the error due to the thermal dislocation and the like cannot be corrected completely. Further, in terms of stability, a gain is not increased in a largely loaded machine, so that a contouring precision is deteriorated. Moreover, if the countermeasure (2) is carried out under hybrid control type, a time lag corresponding to a hybrid time constant is generated. In this case, the lead error of the ball screw, the error due to the thermal dislocation and the like cannot be corrected. Accordingly, in any case, an oblique elliptic error is generated in the circular interpolation.

In any of the above-described cases, the hybrid control type in which a scale feedback is added to an encoder feedback as a first-order lag element has not been described.

The elastic deformation of machine is corrected according to the above-described method in the hybrid control type, and then a difference in the mechanical characteristics is reflected on a transfer function by the scale feedback. Therefore, the difference in the mechanical characteristics is reflected on the transfer function in interpolation of multiple axes, thereby causing a contouring motion error. As a result, a motion precision of the machine is deteriorated.

However, the conventional semi-closed loop control type cannot suppress a mechanical error such as the lead error of the ball screw and the thermal dislocation. As a method for suppressing such the mechanical error, it is considered that the hybrid control type and full closed loop control type are major in future.

The control system of the hybrid control type will be described with reference to an approximate block diagram shown in FIG. 1.

Figure 1:
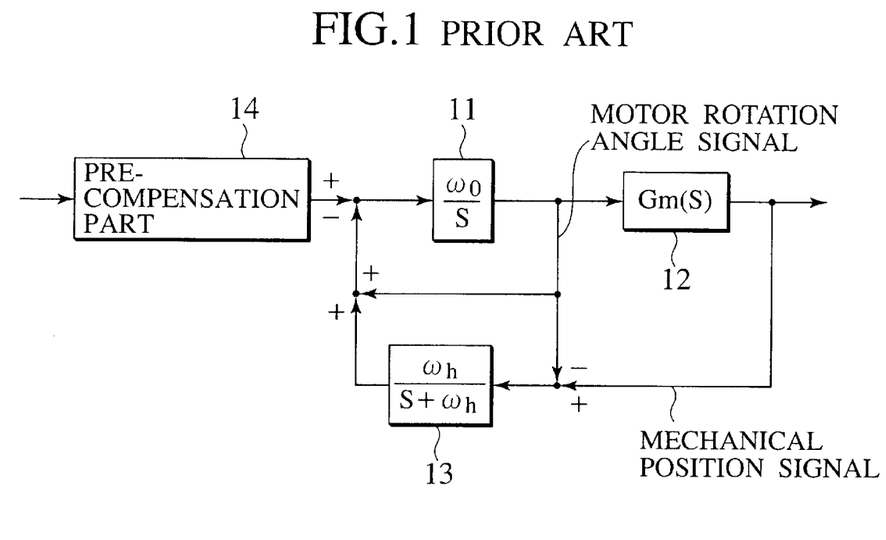
FIG. 1 shows an approximate block diagram of hybrid control type.

In FIG. 1, a reference numeral 11 denotes a servomotor system. A reference numeral 12 denotes a mechanical system including a load such as a feed screw and a table. A reference numeral 13 denotes a low-pass filter. A reference numeral 14 denotes a pre-compensation part. Further, $\omega_o$ is a position loop gain, $\omega_h$ is a first-order lag frequency, s is a Laplace transform operator and $G_m(s)$ is a transfer function of the mechanical system.

The mechanical transfer function $G_m(s)$ is described as follows:

$$G_m(s) = s^2 + 2\zeta\omega_n \cdot s + \omega_n^2$$

where $\zeta$ is a damping ratio and $\omega_n$ is a proper angular frequency.

A total transfer function $G_h(s)$ in this case equals $$G_h(s) = \frac{\frac{\omega_0}{s}}{1 + \frac{\omega_0}{s}\left[\frac{\omega_h}{s + \omega_h}\{G_m(s) - 1\} + 1\right]}$$

Substituting $s = j\omega$ into the above equation, a total frequency transfer function $G_h(j\omega)$ equals $$G_h(j\omega) = \frac{A + jB}{C + jD}$$

where $A = \omega_h \omega_o \omega_n^2$
$B = \omega_o \omega_n^2 \omega$
$C = \omega^4 - \{2\zeta\omega_n(\omega_h + \omega_o) + \omega_n^2\}\omega^2 + \omega_h \omega_o \omega_n^2$
$D = -(\omega_h + \omega_o + 2\zeta\omega_n)\omega^3 + (\omega_h + \omega_o)\omega_n^2 \omega$ As a result of the $G_h(j\omega)$, a gain $|G_h(j\omega)|$ is given as follows:

$$|G_h(j\omega)| = \sqrt{\frac{A^2 + B^2}{C^2 + D^2}}$$

and a phase $\angle G_h(j\omega)$ is $$\angle G_h(j\omega) = \tan^{-1}\left(\frac{AC + BD}{BC - AD}\right)$$

where the proper angular frequency $\omega_n$ is defined as $$\omega_n = \sqrt{\frac{k}{M}}$$

and the damping ratio $\zeta$ is defined as $$\zeta = \frac{c}{2\sqrt{kM}}$$

Therefore, the gain $G_h(j\omega)$ and the phase $\angle G_h(j\omega)$ of the hybrid control type are functions of a mass M, a spring constant k, a viscous damping coefficient c, an angular velocity $\omega$, the first-order lag frequency (hybrid frequency) $\omega_h$ and the position loop gain $\omega_o$.

Ordinarily, according to the hybrid control type, the hybrid frequency $\omega_h$ and the position loop gain $\omega_o$ are set to have the same value in all the axes, so that no gain shift occurs.

Figure 2:
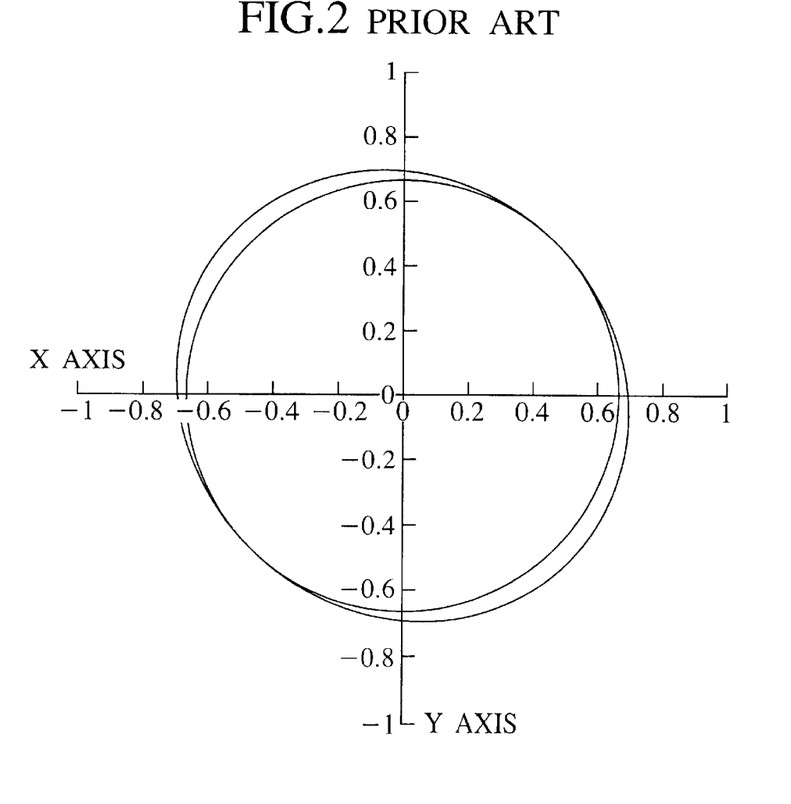
FIG. 2 shows an explanatory diagram indicating an example of an oblique elliptical error.

However, in most cases, the mass M, the spring coefficient k, and the viscous damping coefficient c are different between one axis and another axis in the mechanical system. In other words, the elastic dislocation about each axis differs on each axis and a difference in the mass M, the spring coefficient k and the viscous damping coefficient c generates shift of the gain and the phase about each axis. Hence, the shift of the gain or that of the phase occurs between the axes, and then a circular interpolation motion, which executes two-axes synchronous control, induces a path error (the two axes express X axis and Y axis. Hereinafter, two axes are X axis and Y axis.). Therefore, as shown in FIG. 2, a real circle turns to be an oblique ellipse.

Figure 3A:
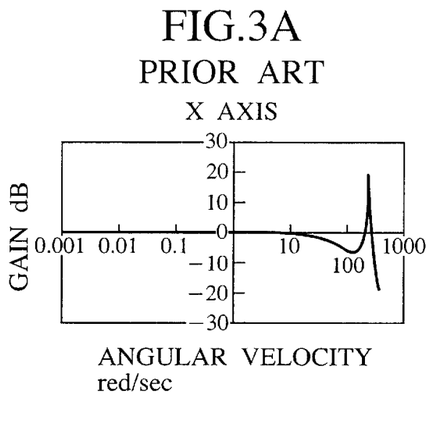
FIGS. 3A and 3B show graphs indicating gain characteristics about two axes.
Figure 3B:
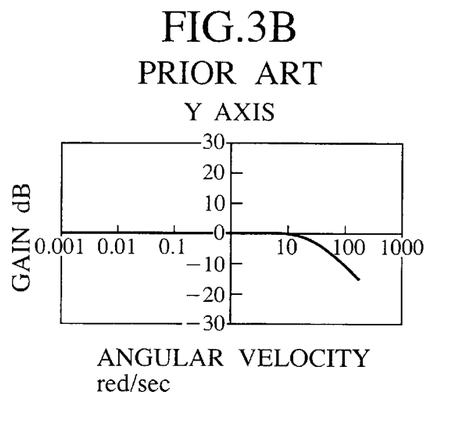
Figure 4A:
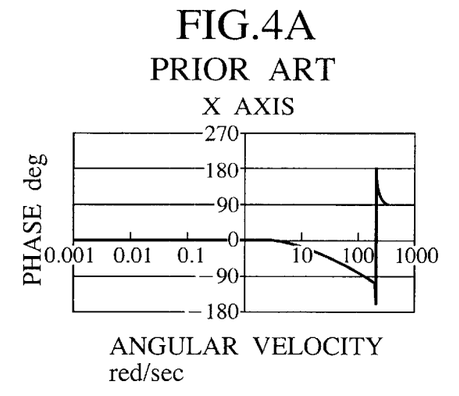
FIGS. 4A and 4B show graphs indicating phase characteristics about two axes.
Figure 4B:
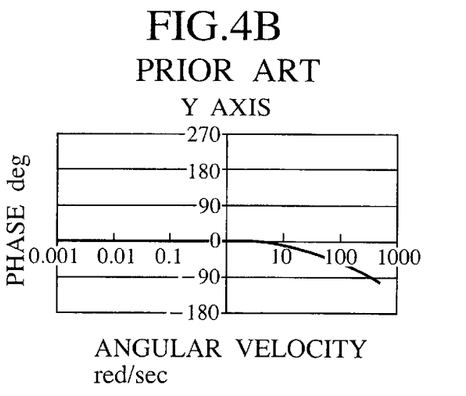

X-axis gain and Y-axis gain are exemplified in FIGS. 3A and 3B. X-axis phase and Y-axis phase are exemplified in FIGS. 4A and 4B. In this example, a proper frequency of the X axis is low, thereby indicating that a peak of gain occurs at a resonance point of the machine and there is a large different gain in neighborhood of the resonance point. In addition, the difference of the phase is also large near the resonance point. Therefore, an oblique-elliptical motion locus is generated.

Figure 5:
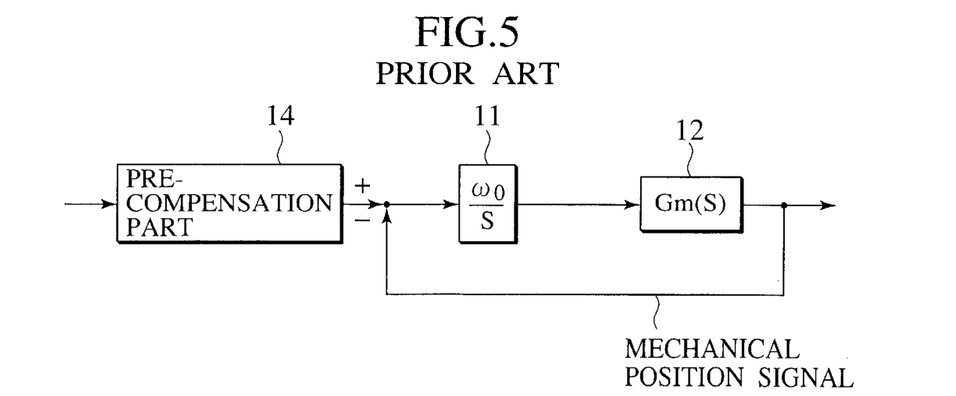
FIG. 5 shows an approximate block diagram of full closed loop control type.

Next, the control system of the full closed loop control type will be described with reference to the approximate block diagram shown in FIG. 5.

A mechanical transfer function $G_m(s)$ in this case is described as follows:

$$G_m(s) = s^2 + 2\zeta\omega_n \cdot s + \omega_n^2$$

A total transfer function $G_{full}(s)$ in this case equals $$G_{full}(s) = \frac{\frac{\omega_0}{s} G_m(s)}{1 + \frac{\omega_0}{s} G_m(s)}$$

Substituting $s = j\omega$ into the above equation, a total frequency transfer function $G_{full}(j\omega)$ is $$G_{full}(j\omega) = \frac{A_f + jB_f}{C_f + jD_f}$$

where $A_f = \omega_o \omega_n^2$
$B_f = 0$
$C_f = -2\zeta\omega_n \omega^2 + \omega_o \omega_n^2$
$D_f = -\omega^3 + \omega_n^2 \omega$ As a result of the $G_{full}(j\omega)$, a gain $|G_{full}(j\omega)|$ is solved as follows:

$$|G_{full}(j\omega)| = \sqrt{\frac{A_f^2 + B_f^2}{C_f^2 + D_f^2}}$$

and a phases $\angle G_{full}(j\omega)$ is solved as follows:

$$\angle G_{full}(j\omega) = \tan^{-1}\left(\frac{A_f C_f + B_f D_f}{B_f C_f - A_f D_f}\right)$$

where the proper angular frequency $\omega_n$ is defined as $$\omega_n = \sqrt{\frac{k}{M}}$$

and the damping ratio $\zeta$ is defined as $$\zeta = \frac{c}{2\sqrt{kM}}$$

Therefore, the gain $G_{full}(j\omega)$ and the phase $\angle G_{full}(j\omega)$ of the full closed loop control type are functions of the mass M, the spring constant k, the viscous damping coefficient c, the angular velocity $\omega$ and the position loop gain $\omega_o$.

Ordinarily, the position loop gain $\omega_o$ is set to have the same value in all the axes, so that no gain shift occurs. However, in most cases, the mass M, the spring coefficient k and the viscous damping coefficient c are different about each axis of the mechanical system.

Accordingly, in case of the full closed loop control type which can correct a mechanical error ideally, a lag corresponding to one cycle of the position loop occurs. Thus, such differences in these mechanical features generate a shift of the gain and the phase about each axis. Therefore, the circular interpolation motion about two axes is executed under the condition that the shift occurs in the gain and the phase between the axes. Then, the oblique elliptical motion shown in FIG. 2 occurs.

SUMMARY OF THE INVENTION

A first object of the present invention is to provide a servo control method for correcting an elastic dislocation error in hybrid control type or full closed loop control type including scale feedback, which is feedback compensation with a detected mechanical position value. A second object of the present invention is to provide a servo control method for suppressing a synchronous error in interpolation on multiple axes. A third object is to provide a servo control method for improving a contouring motion precision.

The first aspect of the present invention provides a servo control method comprising the steps of: operating both a set value of a first-order lag time constant of a feedback compensation by a detected mechanical position value and a transfer function corresponding to a change of an angular velocity for each axis under a multiple-axes simultaneous control; and setting a feedforward amount so that the transfer function about the each axis is the same.

The second aspect of the present invention provides a servo control method further comprising the steps of: detecting a change amount of a load mass; operating a change amount of an inertial force due to the change amount of the load mass; and calculating the transfer function about the each axis taking the change amount of the inertial force into account.

The third aspect of the present invention provides a servo control method still further comprising the steps of: operating the change amount of a stiffness about the each axis corresponding to a mechanical position of the load mass; and calculating the transfer function about the each axis taking the change amount of the stiffness into account.

The fourth aspect of the present invention provides a servo control method according to the third aspect of the invention, wherein the transfer function about the each axis is calculated considering both a change of a viscous damping coefficient and a change of a frictional force against a feed speed.

The fifth aspect of the present invention provides a servo control method according to the fourth aspect of the invention, wherein a thermal dislocation amount difference between the axes is added to an elastic dislocation amount.

DETAILED DESCRIPTION OF THE PREFERRED EMBODIMENTS

Hereinafter, the preferred embodiments of the present invention will be described in detail with reference to the accompanying drawings. In addition, the embodiments of the present invention are employing the same reference numerals of the conventional example with the same configuration described above.

Figure 6:
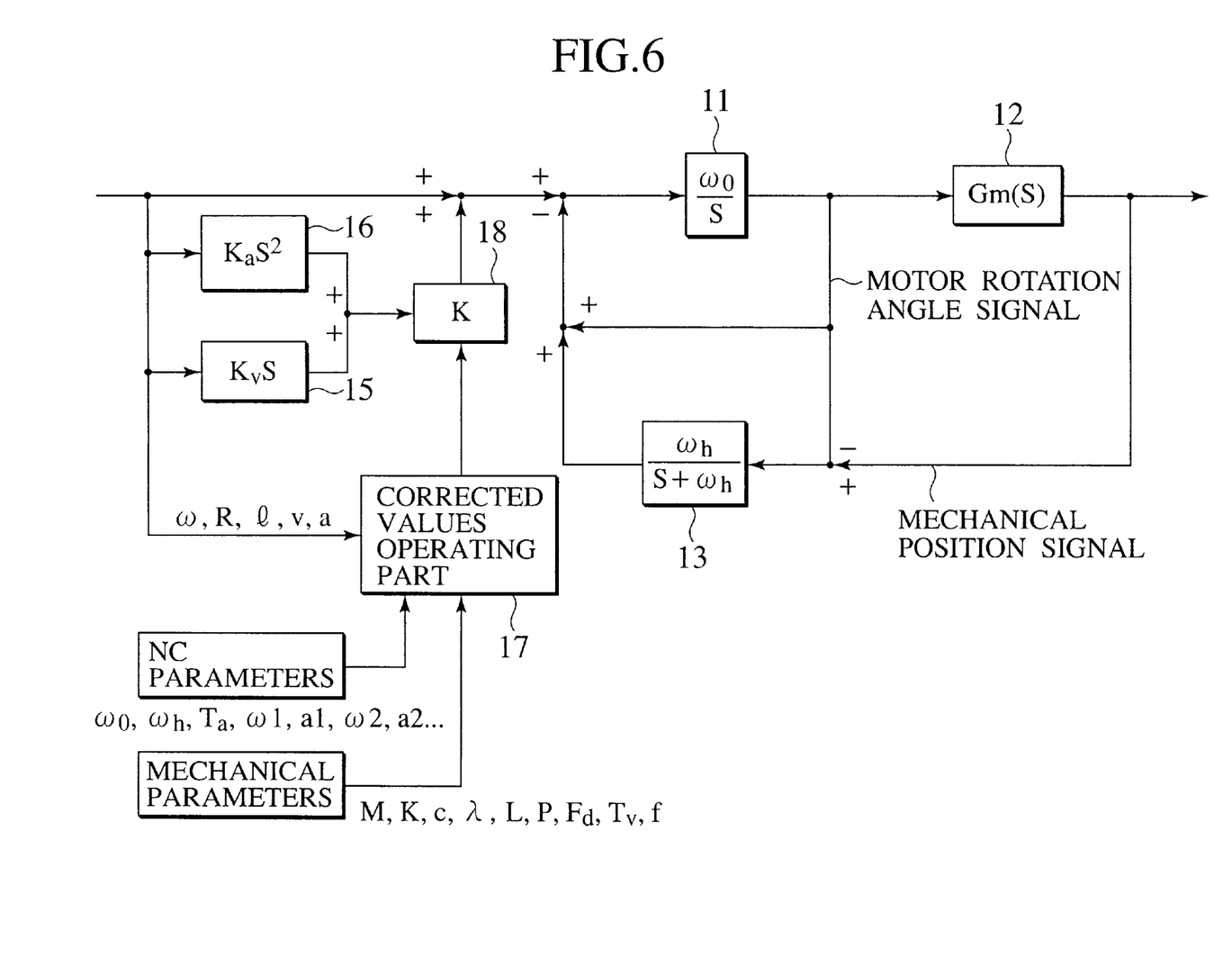
FIG. 6 shows a block diagram indicating a first embodiment of servo control method of the present invention.

FIG. 6 shows an embodiment of the servo control method of the present invention. In FIG. 6, a reference numeral 11 denotes a servomotor system. A reference numeral 12 denotes a mechanical system including such a load as feed a screw, a table. A reference numeral 13 denotes low-pass filter. A reference numeral 15 denotes a velocity feedforward part. A reference numeral 16 denotes an acceleration feedforward part. A reference numeral 17 denotes an operating part for calculating a corrected value K of the gain ratios between axes. A reference numeral 18 denotes a feedforward correcting part.

Information (that is, the angular velocity $\omega 1$, the inclination a1, the angular velocity $\omega 2$, the inclination a2 and the like) on the ratio of transfer function about the two axes with position loop gain $\omega_0$, first-order lag frequency $\omega_h$, acceleration/deceleration time constant $T_a$, angular velocity $\omega$ is inputted to the operating part 17 as NC parameters. Further, mass M, spring constant k, viscous damping coefficient c, ball screw mounting distance L, $\lambda$ ($\lambda$ is obtained by multiplying a ball screw sectional area S by Young's modulus E), frictional force $F_d$, frictional torque $T_v$ and proper frequency f are inputted as mechanical parameters. The corrected value K of the gain ratio between the axes is operated using these NC parameters and mechanical parameters.

The feedforward correcting part 18 corrects both velocity feedforward $K_v s$ and acceleration feedforward $K_a s^2$ by the corrected value K.

Figure 7:
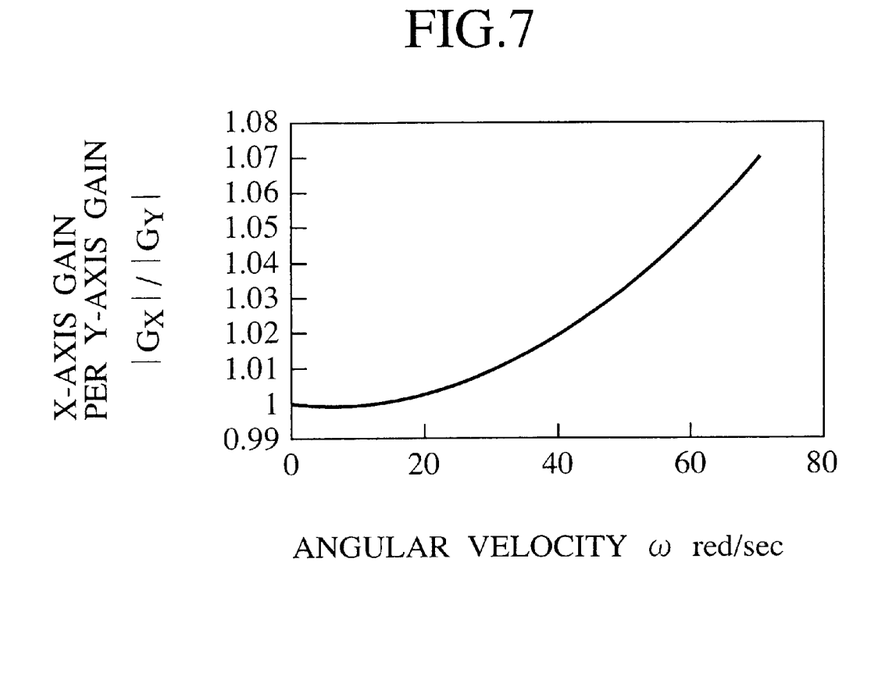
FIG. 7 shows a graph indicating the relation between angular velocity and gain ratio between two axes.
Figure 8:
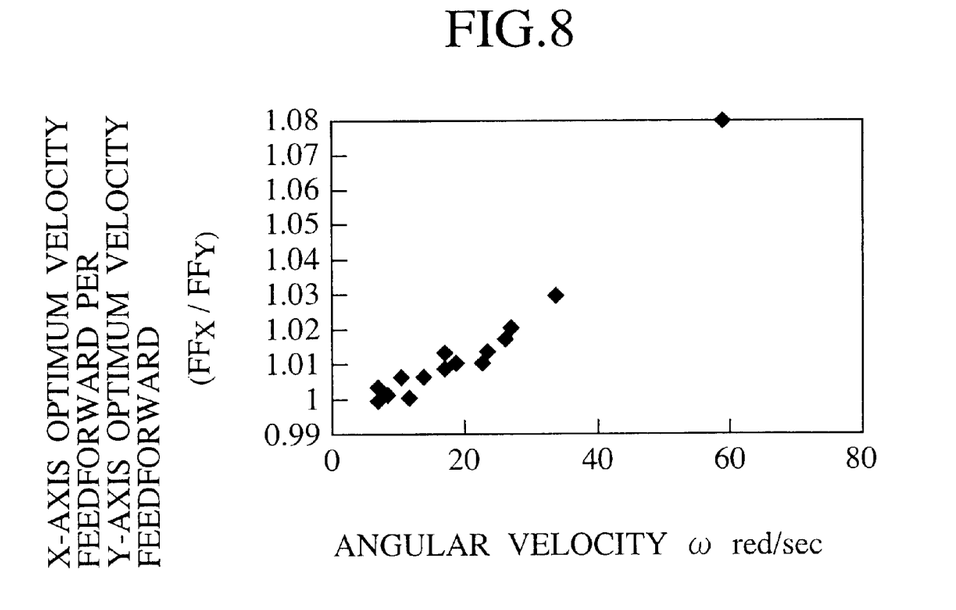
FIG. 8 shows a graph indicating measured values about the relation angular velocity and ratio of velocity feedforwards between two axes.

FIG. 7 shows the relation between the angular velocity $\omega$ and X-axis gain per Y-axis gain ($|G_x|/|G_y|$). FIG. 8 shows the relation between the angular velocity $\omega$ and X-axis optimum velocity feedforward per Y-axis optimum velocity feedforward ($FF_x/FF_y$), which is gained as a test result of an actual machine. It has been confirmed that the relation between the ratio of optimum velocity feedforwards ($FF_x/FF_y$) and the angular velocity $\omega$ is almost the same as the relation between the ratio of gain about two axes ($|G_x|/|G_y|$) and the angular velocity $\omega$.

Then, the gain ratio about each axis is obtained by the angular velocity $\omega$. The gain ratio about each axis is multiplied with feedforward set values. Therefore, in case of the hybrid control type, the elastic dislocation can be corrected without generating a path error so as to form an oblique ellipse.

Next, a method for calculating mechanical parameters such as mass M, spring constant k, and viscous damping coefficient c is described. Upon calculating such mechanical parameters, the semi-closed control method is employed as a type to control an object machine in which the mechanical parameters are calculated.

In the semi-closed loop control type, a transfer function $G_s(s)$ from a commanded part to a motor position is given as follows:

$$G_s(s) = \frac{\omega_0}{s + \omega_0}$$

Absolute value of the above equation is obtained as follows:

$$|G_s(j\omega)| = \frac{\omega_0}{\sqrt{\omega_0^2 + \omega^2}}$$

This equation is a function of $\omega_o$, so that the transfer function in the semi-closed loop control type receives no mechanical influence.

Here, a case of a X-Y axes plane is described as an example. The circular interpolation motion about both the X axis and the Y axis is commanded with two turns or more. At this time, a commanded value (that is, a position calculated from a rotation angle of the servomotor) and a mechanical position are detected. Moreover, the pre-compensation is set in order to eliminate an influence of a reduction amount of the radius.

Figure 9:
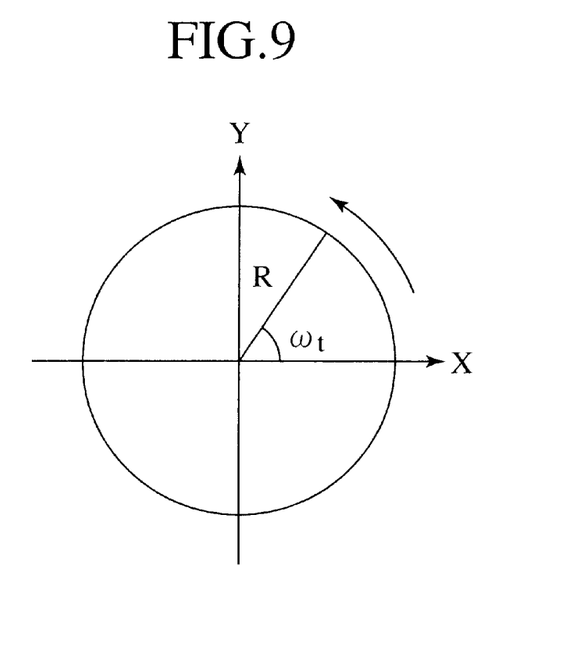
FIG. 9 shows an explanatory diagram indicating a circular interpolation motion.

In FIG. 9, commanded values x* and y* about the axes X and Y are defined as x*=Rcos$\omega$t
y*=Rsin$\omega$t where R is a radius of a circle, $\omega$ is an angular velocity and t is a time.

The commanded velocities $v_x$ about X axis, $v_y$ about Y axis and the commanded accelerations $\alpha_x$ about X axis, $\alpha_y$ about Y axis are determined by the first-order differential of both x* and y* and the second-order differential of both x* and y*, respectively, so that below equations are obtained.

$v_x$=-R$\omega$sin$\omega$t
$v_y$=R$\omega$cos$\omega$t
$\alpha_x$=-R$\omega^2$cos$\omega$t
$\alpha_y$=-R$\omega^2$sin$\omega$t If the elastic dislocation $\sigma$ is calculated from the equation of motion, then $$\sigma = -\frac{M\alpha + cv}{k}$$

When $\omega_t$=2n$\pi$(n is integer, where the motion start point and the motion termination point are excluded because they may be affected by others).

$v_x$=0
$v_y$=R$\omega$
$\alpha_x$=-R$\omega^2$
$\alpha_y$=0

Thus, $$\sigma_x = \frac{M_x R \omega^2}{k_x}$$

$$\sigma_y = -\frac{c_y R \omega}{k_y}$$

The elastic dislocation can be measured actually as a difference between a motor position and a mechanical position. The mass M can be calculated from a design value or a torque. The circle radius R and angular velocity $\omega$ can be read from a program.

Therefore, the stiffness $k_x$ about the X axis is determined as follows:

$$k_x = \frac{M_x R \omega^2}{\sigma_x}$$

In addition, when $\omega_t$=$\pi$/2, $v_x$=-R$\omega$
$v_y$=0
$\alpha_x$=0
$\alpha_y$=-R$\omega^2$ Thus, $$\sigma'_x = \frac{c_x R \omega}{k'_x}$$

$$\sigma'_y = \frac{M_y R \omega^2}{k'_y}$$

Therefore, the stiffness $k'_y$ about Y axis is determined as follows:

$$k'_y = \frac{M_y R \omega^2}{\sigma'_y}$$

The circle radius R is small, and then it can be considered that $k_x$=$k'_x$ and $k_y$=$k'_y$.

Therefore, the viscous damping coefficients $c_x$ and $c_y$ are determined.

$$c_x = \frac{k'_x \sigma'_x}{R\omega} = M_x \omega \frac{\sigma'_x}{\sigma_x}$$

$$c_y = -\frac{k_y \sigma_y}{R\omega} = -M_y \omega \frac{\sigma_y}{\sigma'_y}$$

The machine is operated by the circular interpolation under the semi-closed loop control type, and a position calculated from the servomotor is compared with a mechanical position, thereby the method for obtaining both the stiffness and the viscous damping coefficient about each axis is described above.

Additionally, the axial stiffness, the frictional force and the viscous damping coefficient can be obtained by an actual measurement of the lost motion, a static rigidity test, a measurement of the frictional force and the like.

The above-described calculations are carried out assuming that the axial direction stiffness k is not changed by the mechanical position under the condition $k_x$=$k'_x$ and $k_y$=$k'_y$. However, if ball screw drive and the like are employed, the axial direction stiffness of the screw axis is different depending on a position (that is, the mechanical position) to which a load is applied.

Even under the condition that he ball screw drive is employed and the axial stiffness of the screw axis is different depending upon a position to which the load is applied, the mechanical parameters can be operated by the above-described actual measurement if the start position of the circular interpolation is changed. However, the number of measurements is increased if the above method is employed. The stiffness of the ball screw axis is determined as a function of a load application position and the change of the stiffness according to the load application position is operated in advance, thereby an almost strict solution can minimize the number of measurements.

In case of the ball screw drive, the axial direction synthetic stiffness k equals $$k = \frac{k_T k_b}{k_T + k_b}$$

where $k_b$ is the ball screw stiffness and $k_T$ is the other synthetic stiffness.

In case where the ball screw is mounted such that both ends thereof are fixed, the ball screw stiffness $k_b$ is $$k_b = \lambda \frac{L}{l(L-1)}$$

where $\lambda = S \cdot E$ (S is ball screw sectional area and E is Young's modulus (Young's modulus is constant.).);

L is a ball screw mounting distance; and l is a load application position.

The other synthetic stiffness $k_T$ includes the stiffness of a ball screw nut, the stiffness of a ball screw supporting bearing, the stiffness of a nut and a bearing mounting part and the like. If the circle radius is large, a corrected stiffness k is used in calculating the viscous damping coefficient.

In the above description, the viscous damping coefficient c is almost constant. However, in case that the frictional force varies according to the sliding speed along Stribeck curve e.g., a sliding guide, and that the kinematic viscosity of the lubricant is high and the frictional force is not proportional to the sliding speed, the relation between the feed speed and the frictional force is measured actually. Thus, the relation between the viscous damping coefficient and the feed speed is obtained. In addition, Coulomb friction is compensated by the feedforward control of the torque by means that correcting the quadrant stub at the time of an axis inversion.

Figure 10:
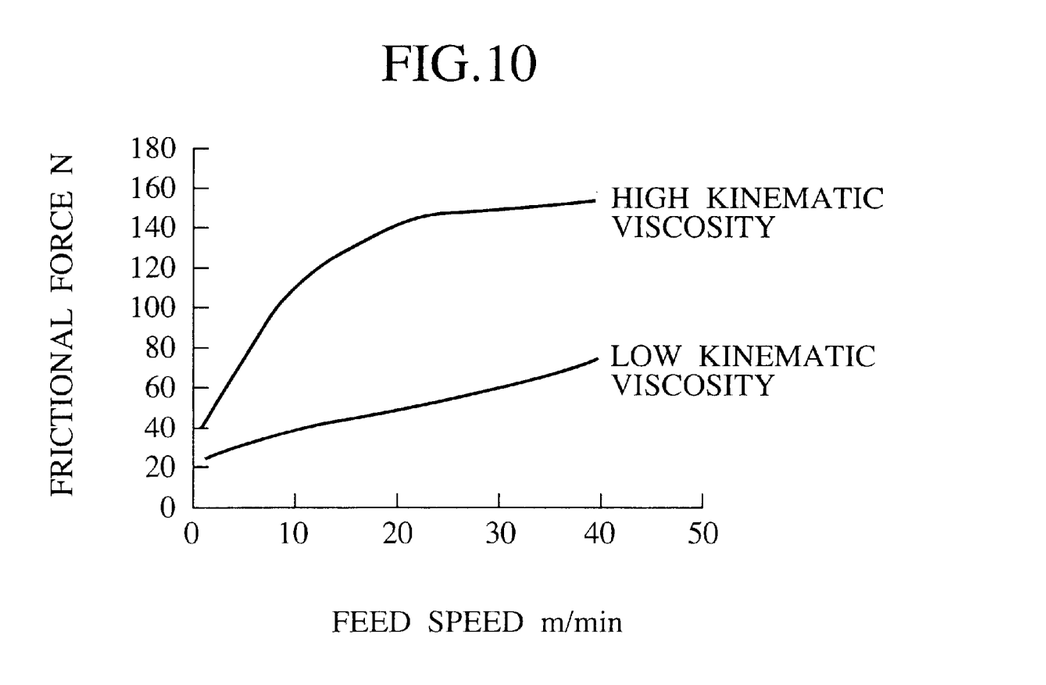
FIG. 10 shows a graph indicating the relation between frictional force and feed speed (comparison of two different kinematic viscosities)

FIG. 10 shows an example of the relation between the feed speed and the frictional taking the amount of the kinematic viscosity into account.

The following method is available as an example of the method for measuring the relation between the feed speed and the frictional force. Namely, there is a method that the feed axis torque under a steady state (the machine is not accelerated under this state.) at the time of the one-axis linear interpolation is detected and recorded every each feed speed. In this method, a memory for recording the frictional force data versus the feed speed data is only needed.

Using the above-described method, the viscous damping coefficient $c_0$ under a certain condition is obtained. The viscous damping coefficient $c_n$ against an arbitrary feed speed can be determined as follows:

$$c_n = \frac{Tv_n}{Tv_0} c_0$$

where $Tv_n$ and $Tv_0$ are the frictional torque against the arbitrary feed speed.

In case of the ball screw drive, the relation between a frictional torque T and a frictional force $F_d$ is described as follows:

$$T = \frac{P}{2\pi} F_d$$

where P is a lead of ball screw and $F_d$ is a rate of the torque change accompanied with the feed speed change. $F_d$ corresponds to a rate of the frictional force change.

Further, a change amount of motional mass is detected, such that a change amount of the inertial force can be operated and corrected. A method for detecting the change amount of the motional mass is described. Before and after a load mass is mounted on a work table, the one-axis linear interpolation under the same feed speed condition is commanded, so as to measure the torque under the steady state. Inertial moment is approximated by an increase amount of the torque under the steady state, so that the load mass can be estimated.

In the case that the proper frequency in the axial direction of the machine can be detected (e.g., a case that the open loop transfer function of the velocity control can be obtained), the change of the mass can be determined from the change of the proper frequency.

The proper frequency f is defined as $$f = \frac{1}{2\pi} \sqrt{\frac{k}{M}}$$

Therefore, $$M = \frac{k}{(2\pi f)^2}$$

Accordingly, the change of the mass is inversely proportional to the square of the change of the proper frequency.

Figure 11:
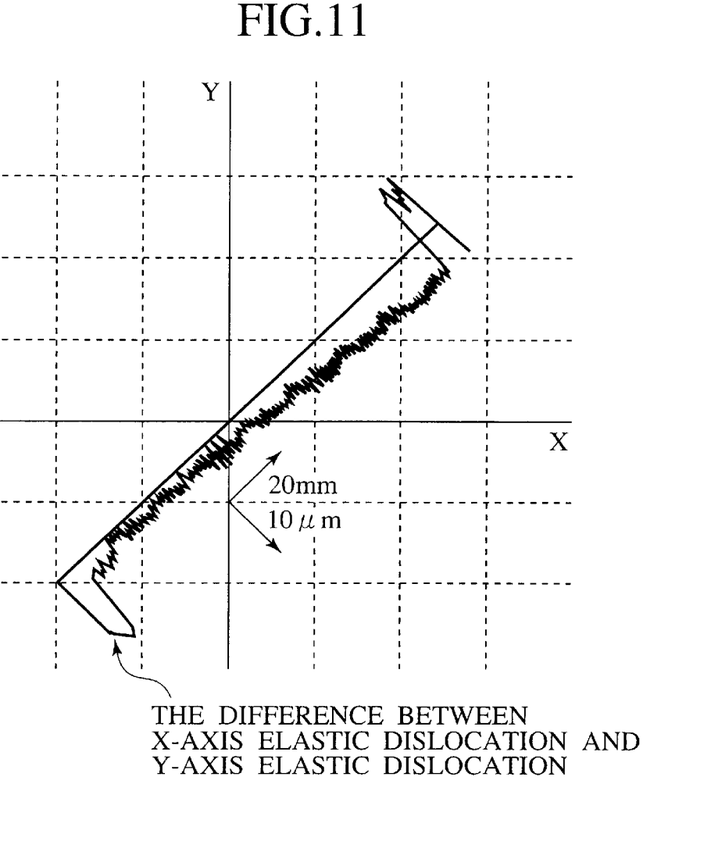
FIG. 11 shows a graph indicating measured values about a difference of elastic dislocation by inertial force between two axes.

Next, a method for measuring a difference between the elastic dislocations about two axes according to the inertial force is described. Here, one example (namely, the difference of the elastic dislocations about two axes is measured actually.) will be described, the linear interpolation motion about two axes at 45° is commanded, and then an error $\Delta\sigma(=\sigma_x - \sigma_y)$ at a time of the acceleration or the deceleration is detected. FIG. 11 shows an example of the result of the actual measurement. Moreover, FIG. 11 shows a difference between X-axis elastic dislocation and Y-axis elastic dislocation being generated by the inertial force.

If the frictional forces are almost the same about X axis as about Y axis, the elastic dislocation about X axis and the elastic dislocation about Y axis are obtained as follows:

$$\sigma_x = \frac{M_x \alpha}{k_x}$$

$$\sigma_y = \frac{M_y \alpha}{k_y}$$

The mass is known preliminarily, and then the stiffness about each axis can be calculated by measuring the acceleration under two or more conditions as shown above.

In some cases, Abbe's error may exist in a position detector (a scale and the like) provided on the machine, or the deflection of the machine structure may be included. In the case that Abbe's error exists, the mechanical position is not detected with any scale, but the above-described circular interpolation precision is measured with a plane scale about two axes. Then, the mechanical position is compared with the commanded position value. If the deflection of the machine structure is so large, it may be measured at plural points, thereby obtaining the relation between the measurement point and the deflection of the machine structure at the measurement point. Further, the deflection of the machine structure may be calculated by the structural analysis (e.g., finite element method) in advance, so as to correct the calculated value of the deflection of the machine structure.

Next, a method for correcting the difference between the transfer functions about two axes will be described. FIG. 7 shows the relation between the angular velocity ω and X-axis gain per Y-axis gain ($|G_x|/|G_y|$). However, it needs labor very much to strictly solve the ratio of the transfer functions about two axes. It may be adopted the approximation based on a curve as shown in FIG. 7.

EXAMPLE 1

The hybrid transfer function includes the first-order lag element. Thus, the approximation is done with the exponential function.

EXAMPLE 2

Figure 12:
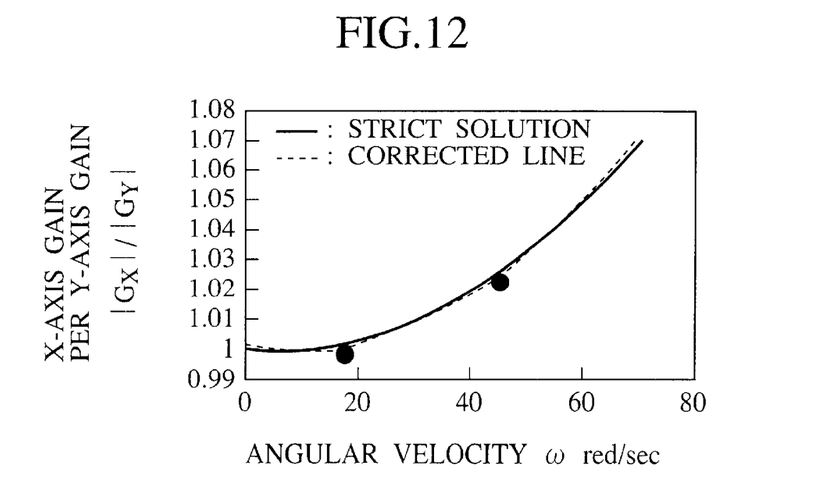
FIG. 12 shows a graph indicating an example of a corrected line which approximates the relation between angular velocity and gain ratio.

If the angular velocity is low, the gain shift is small. Then, the value of the X-axis gain per Y-axis gain can be regarded to be almost 1. Thus, (1) this correction coefficient of the value of the X-axis gain per Y-axis gain is assumed to be 1 up to a certain angular velocity. (2) At the angular velocity range greater or equal to the angular velocity ωa at which the value of the X-axis gain per Y-axis gain is so large, a curve at the foregoing angular velocity range is linearly approximated with plural straight lines.

FIG. 12 shows a correcting pattern of the example 2. In FIG. 12, a full line expresses a strict solution and a dotted line expresses a corrected line. FIG. 12 is an example in which the approximation is done with three straight lines. Straight line 1 is characterized by that an angular velocity ω1 equals 18 and an inclination of the straight line 1 a1 equals 0. Straight line 2 is characterized by that an angular velocity ω2 equals 45 and an inclination of the straight line 2 a2 equals 0.0009. Straight line 3 is characterized by that an angular velocity ω3 is infinity and an inclination of the straight line 3 a3 equals 0.0002. Therefore, the above-described correcting pattern simplifies complicated operations, so that the number of NC operational processing can be decreased.

Figure 13:
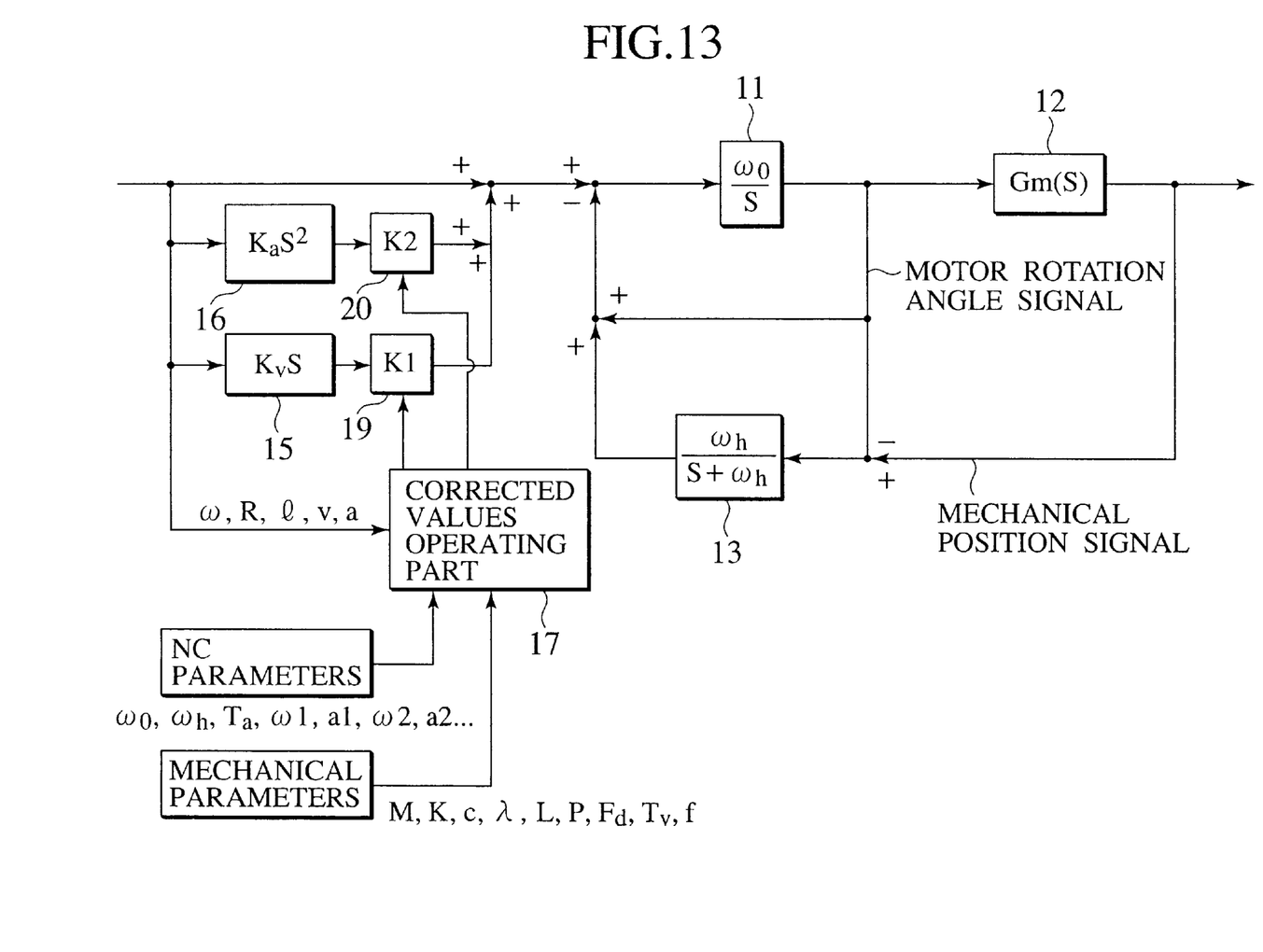
FIG. 13 shows a block diagram indicating a second embodiment of servo control method of the present invention.

FIG. 13 shows an embodiment of the servo control method of the present invention in which the viscous friction varies due to the machine condition. In FIG. 13, like a reference numerals are attached to the same components as FIG. 6 and description thereof is omitted.

NC parameters and mechanical parameters are inputted to a corrected values operating part 17 like the above-described embodiment, so that a velocity feedforward corrected coefficient K1 and an acceleration feedforward corrected coefficient K2 are operated in the corrected values operating part 17.

A velocity feedforward correcting part 19 corrects a velocity feedforward $K_v s$ with the corrected coefficient K1. An acceleration feedforward correcting part 20 corrects an acceleration feedforward $K_a s^2$ with the corrected coefficient K2.

Therefore, In the case that the viscous friction varies due to the machine condition, the velocity feedforward $K_v s$ and the acceleration feedforward $K_a s^2$ can be corrected with the independent corrected coefficients K1 and K2.

In any embodiment, a heat change correction can be done about an axis in which the heat conduction about the axis is very different from the heat conduction about other axes. The heat change correction is to multiply a thermal corrected coefficient with a frictional force and adding a difference of a thermal dislocation amount between the axes is added to an elastic dislocation amount Moreover, the servo control method of the present invention can be applied to the full closed loop control type as well as the hybrid control type.

According to the servo control method of the present invention, this servo control method is carried out to multiple axes using the hybrid control type or the full closed loop control type, and then the gain shift, which is generated by a mechanical characteristics difference about each axis, can be corrected. Further, a contouring motion error can be reduced. In addition, this servo control method particularly effectuates the reduction of an oblique elliptic error at a high-speed circular interpolation or at an orbit boring and effectuates the reduction of the contouring motion error in transient state.

The present disclosure relates to subject matter contained in Japanese Patent Application No. 2001-121239, filed on Apr. 19, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A servo control method comprising the steps of:

operating both a set value of a first-order lag time constant of a feedback compensation by a detected mechanical position value and a transfer function corresponding to a change of an angular velocity for each axis under a multiple-axes simultaneous control; and setting a feedforward amount so that the transfer function about the each axis is the same.

2. A servo control method according to claim 1, further comprising the steps of:

detecting a change amount of a load mass;

operating a change amount of an inertial force due to the change amount of the load mass; and calculating the transfer function about the each axis taking the change amount of the inertial force into account.

3. A servo control method according to claim 2, still further comprising the steps of:

operating the change amount of a stiffness about the each axis corresponding to a mechanical position of the load mass; and calculating the transfer function about the each axis taking the change amount of the stiffness into account.

4. A servo control method according to claim 3, wherein the transfer function about the each axis is calculated considering both a change of a viscous damping coefficient and a change of a frictional force against a feed speed.

5. A servo control method according to claim 4, wherein a difference of a thermal dislocation amount between the axes is added to an elastic dislocation amount.

* * * * *